United States Patent [19]

Bilodeau

[11] 3,949,860

[45] Apr. 13, 1976

[54] APPARATUS FOR REMOVING ARTICLES FROM A MOLDING MACHINE AND DEPOSITING THEM ON A CONVEYOR

[75] Inventor: Richard D. Bilodeau, North Stonington, Conn.

[73] Assignee: Monsanto Company, St. Louis, Mo.

[22] Filed: July 26, 1974

[21] Appl. No.: 492,001

[52] U.S. Cl. .................. 198/25; 198/210; 294/88; 425/DIG. 232
[51] Int. Cl.² .................. B65G 47/04; B65G 47/86
[58] Field of Search .................. 198/25, 210, 240; 214/1 BD, 1 BC; 294/88, 116; 425/DIG. 232

[56] References Cited
UNITED STATES PATENTS

| | | | |
|---|---|---|---|
| 294,147 | 2/1884 | Poole | 294/115 |
| 2,349,638 | 5/1944 | Schreiber | 198/210 |
| 2,888,131 | 5/1959 | Allen | 198/25 |
| 3,175,702 | 3/1965 | Banyas | 198/25 |
| 3,218,669 | 11/1965 | Barker | 425/455 |
| 3,355,009 | 11/1967 | Carter | 198/25 |
| 3,365,748 | 1/1968 | Cote | 425/246 |
| 3,648,821 | 3/1972 | Rudolph et al. | 198/240 |
| 3,744,838 | 7/1973 | Jackson | 294/116 |
| 3,770,098 | 11/1973 | Baugnies et al. | 198/25 |

*Primary Examiner*—Evon C. Blunk
*Assistant Examiner*—Jeffrey V. Nase
*Attorney, Agent, or Firm*—Michael J. Murphy

[57] ABSTRACT

In apparatus for removing articles from a vertical, wheel-type blow molding machine where the mold sections move parallel to the wheel axis, the improvements which include a vertically oriented, rotatable turret adjacent the periphery of the wheel machine carrying a number of circumferentially spaced, pivotally mounted article pickup assemblies, cam-acutated means for orienting each pickup assembly with respect to the article being removed and an adjacent conveyor surface and means, preferably employing cam-actuated air flow valves, for cyclically operating article engaging jaws of the pickup assemblies.

6 Claims, 8 Drawing Figures

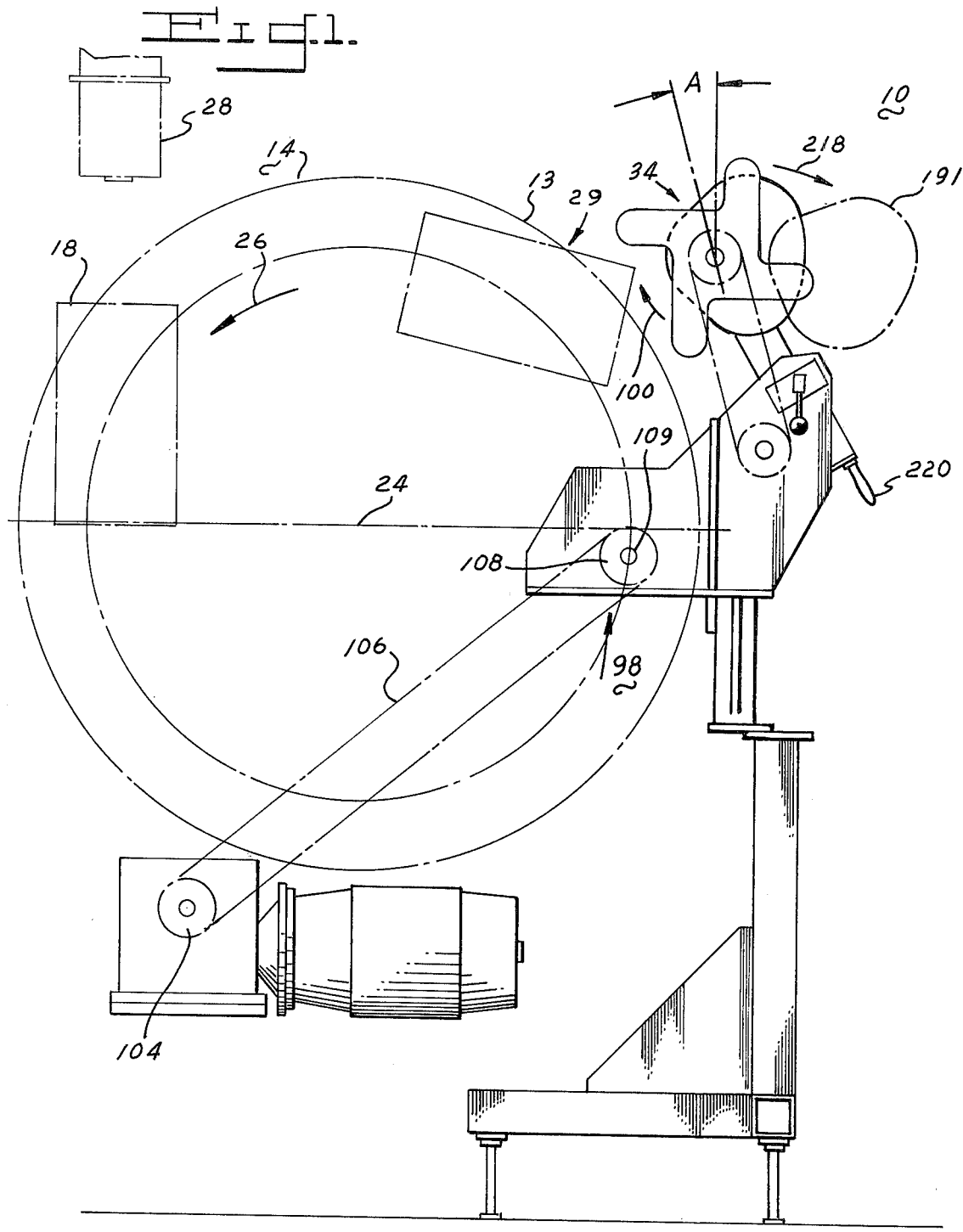

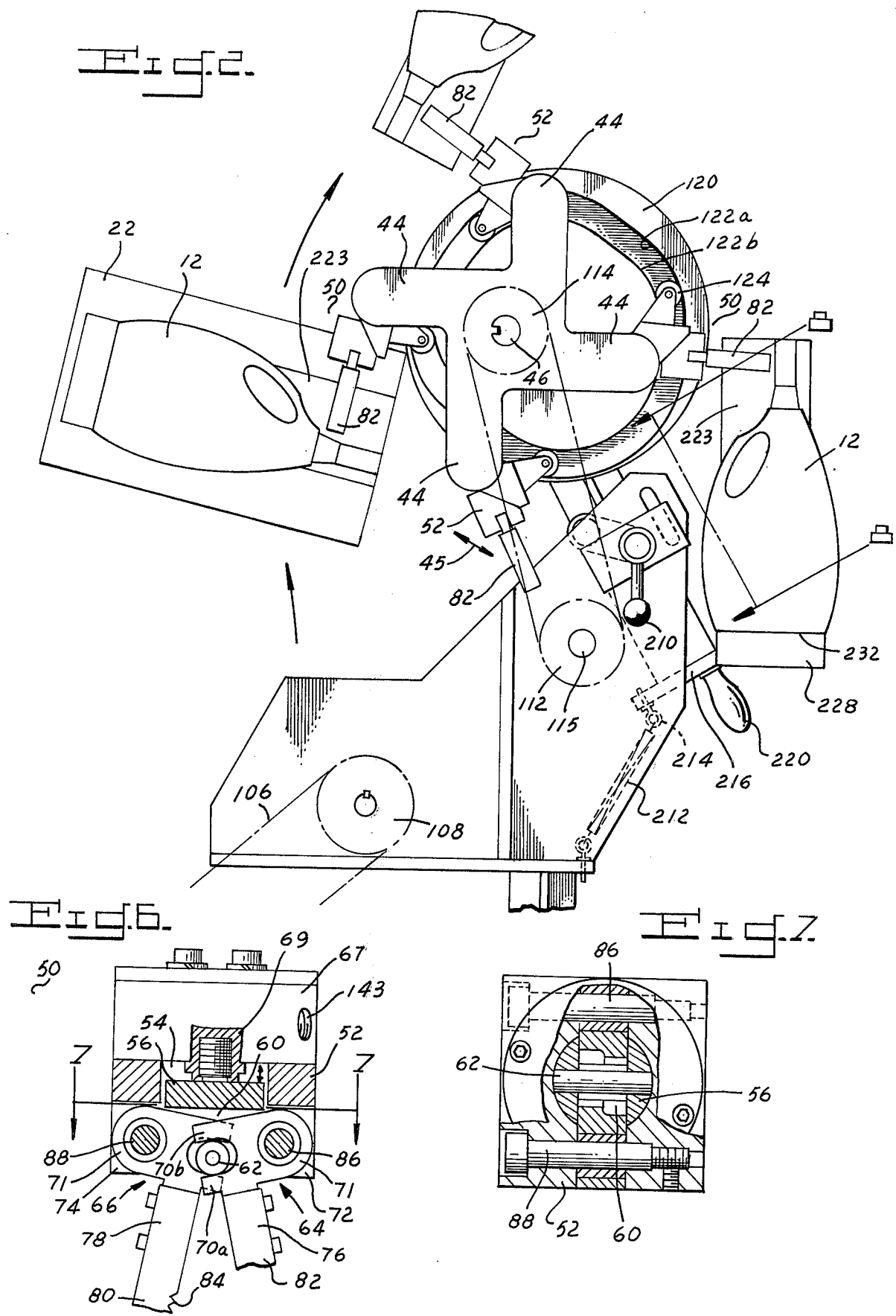

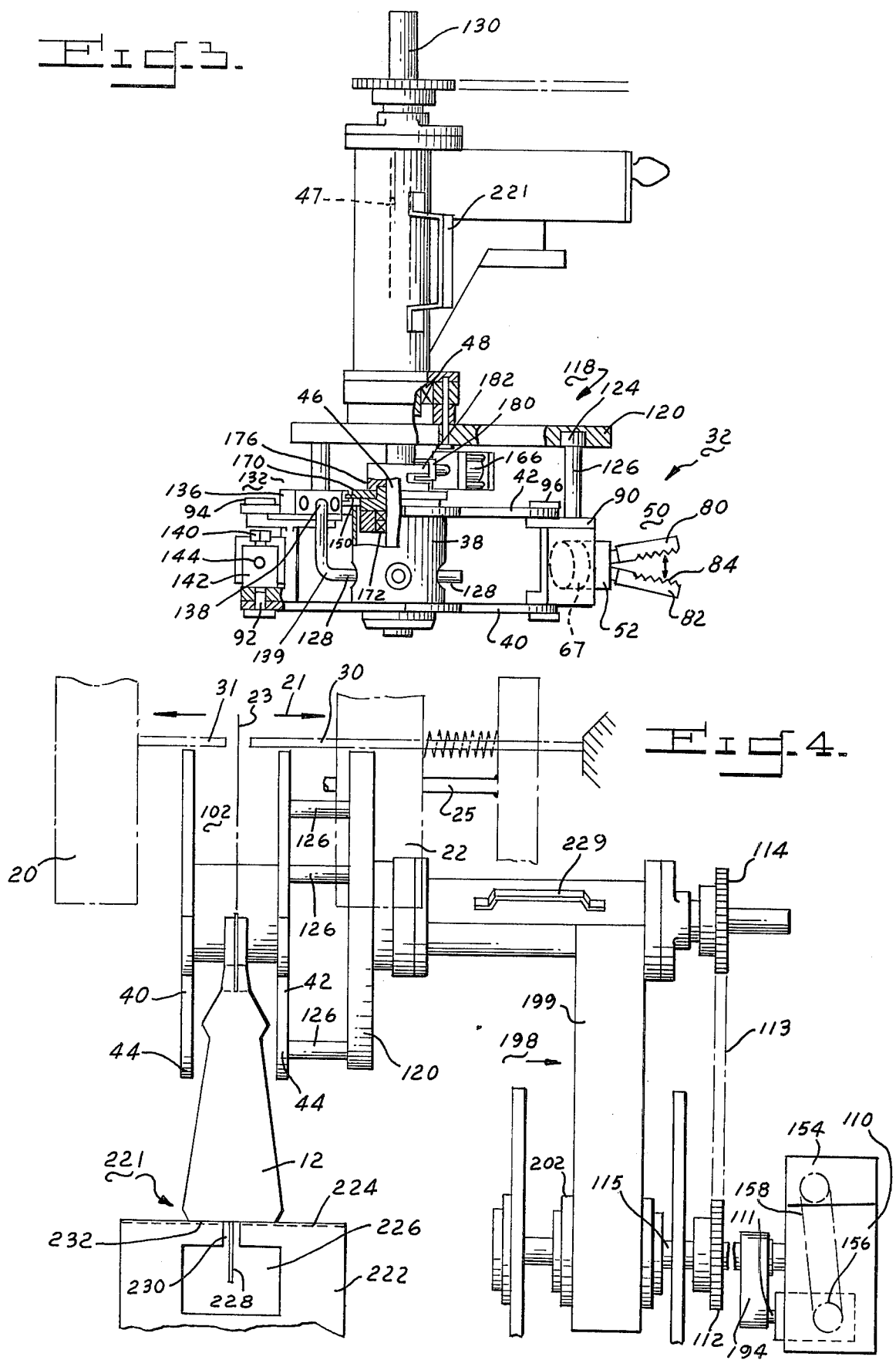

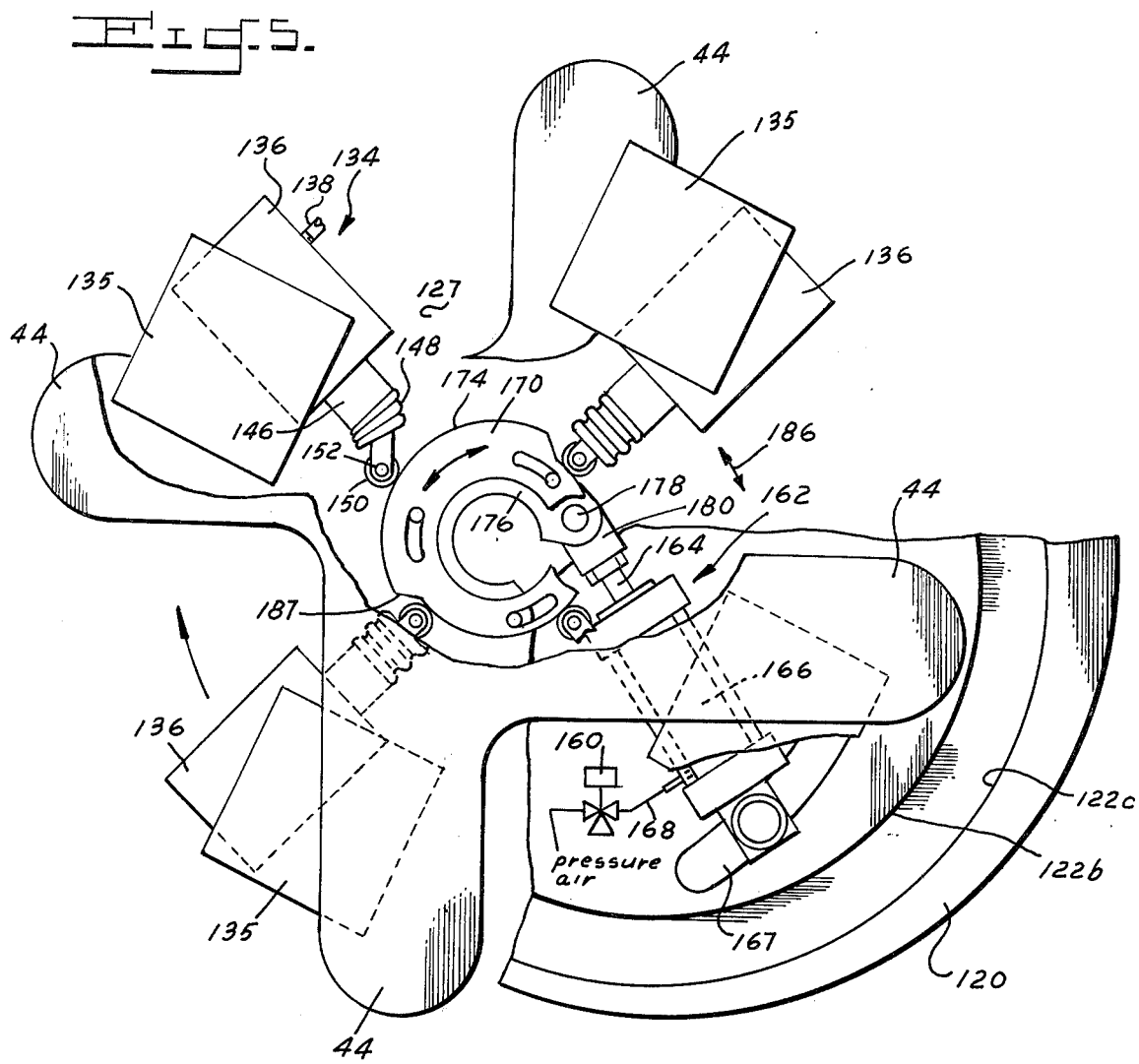
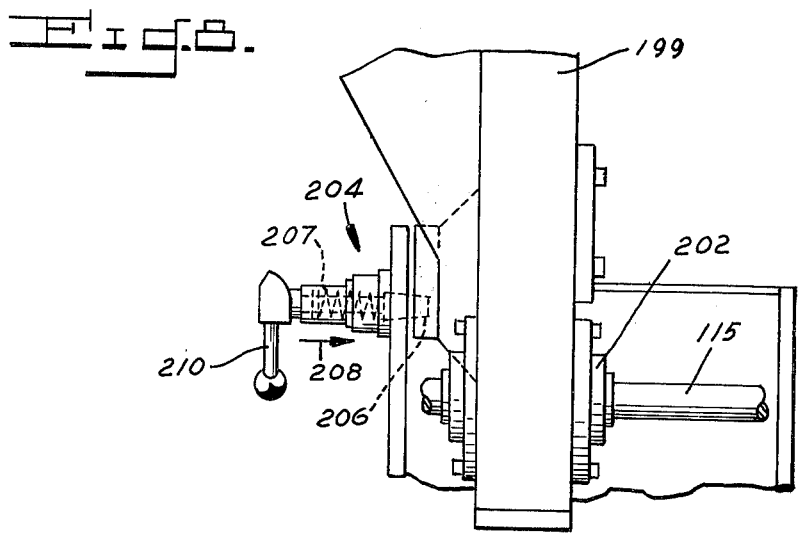

APPARATUS FOR REMOVING ARTICLES FROM A MOLDING MACHINE AND DEPOSITING THEM ON A CONVEYOR

BACKGROUND OF THE INVENTION

This invention relates to removing articles from a vertical, wheel blow molding machine and more particularly to apparatus for removing articles from such a machine of the type wherein the mold sections close and open parallel to the wheel axis, and for depositing such articles on an adjacent takeaway conveyor.

In the past, blown articles have been removed in finished or semi-finished (i.e. with waste flash still attached) form from the discharge area of wheel blow molding machines by gravity ejection onto a chute feeding a conveyor supplying a surge hopper. An operator at the hopper outlet then usually manually fed the articles to the next downstream work station, such as a trimming machine. If the articles could be mechanically controlled during removal from the molding machine such that they could be forwarded directly to the next work station, manpower could be reduced and the hopper bypassed. Also, forwarding directly from the molding machine to the trimming machine insures a more uniform temperature of the plastic at the time of trimming and therefore a more uniformly trimmed article.

U.S. Pat. No. 3,770,098 discloses controlled removal of containers from molds of a wheel machine of the type using hinged "book" molds wherein one section is rigidly mounted on a support and the other is pivotaly attached thereto for opening and closing the mold.

An equally commercially popular wheel blow molding machine utilizes molds wherein each section simultaneously moves horizontally parallel to the machine axis during opening and closing. This type of movement has the advantage over other forms of evenly contacting the hot, tangentially fed parison with both sections of the closing mold at the same time, thus avoiding any uneven chilling effects which can occur when one portion of the mold contacts the parison appreciably ahead of another. With this type of machine employing horizontally operating molds, the formed part, just prior to release for gravity ejection from the machine, is conventionally suspended momentarily on the mold parting line in the mold-open portion of the machine periphery between a pair of article knockout pins and fully out of engagement with the recessed portions of each section. A more complete description of this type of machine is set forth in U.S. Pat. No. 3,365,748.

Removal of molded articles in a controlled manner from a machine of the type just-mentioned has however, up till now, not been possible as far as is known, the system of the aforementioned 3,770,098 patent presenting substantial clearance problems between the arcuately downwardly descending arms of the system therein disclosed and the continuously moving mold sections of the machine.

SUMMARY OF THE INVENTION

Now, however, apparatus has been developed for controlled removal of articles from a vertically oriented, wheel blow molding machine, and particularly such a machine of the type wherein the mold sections open and close horizontally parallel to the machine axis, with each mold parting line lying in a plane perpendicular to such machine axis.

Accordingly, a principal object of this invention is to provide apparatus for removing articles from a wheel blow molding machine of the aforementioned type.

Another object is to provide such apparatus wherein each article is picked up and held in positive registration while moving between the mold unloading region of the machine and a downstream conveyor where it is gently deposited in a controlled preselected attitude such as an upright position resting on its base.

A further object is to provide such article removal apparatus with flexibility for readily varying the timing of the article pickup point in the removal cycle in order to tractably accommodate different article configurations without requiring substantial equipment changes.

A particular object of this invention is to provide apparatus of the aforementioned type with provisions for moving the article engaging parts sufficiently away from the wheel machine as to provide access to the molds for servicing without changing the synchronous relation between the molding machine and removal apparatus.

Other objects of this invention will in part by obvious and will in part appear from the following disclosure and claims.

These and other objects are accomplished by providing apparatus for removing articles from a wheel blow molding machine and depositing them on a conveyor, such machine having a plurality of molds which open parallel to the wheel axis, such apparatus comprising, in combination, a turret assembly including a vertically oriented, rotatably mounted turret adjacent the periphery of the wheel machine carrying article pickup assemblies pivoted to the turret, each pickup assembly including article gripping means coplanar with the parting line of the sections, drive means for moving the turret in synchronism with and in a circumferential direction opposite to that of the molding machine to sequentially advance the article gripping means through the space between successively presented separated mold sections for engagement with the articles, means for orienting the gripping means of each pickup assembly with respect to the article being removed and the conveyor, and means to actuate the gripping means of the pickup assemblies.

BRIEF DESCRIPTION OF THE DRAWINGS

In describing the overall invention reference will be made to the accompanying drawings wherein:

FIG. 1 is a vertical, partially schematic, assembly view of apparatus embodying the present invention particularly illustrating its positional relationship to the wheel molding machine with which it is preferably used;

FIG. 2 is a vertical, front elevational view of main portions of the article removal apparatus of FIG. 1;

FIG. 3 is a plan view of the apparatus of FIG. 2;

FIG. 4 is an enlarged, elevational view of the integrated assembly of FIG. 1 in somewhat greater detail and looking from the right side in FIG. 1, illustrating a form of downstream conveyor for accommodating articles removed from the molding machine;

FIG. 5 is a partially schematic view of part of the apparatus of FIG. 2 illustrating the actuation system for the article gripping means;

FIG. 6 is a central sectional, elevational view of a form of article pickup assembly;

FIG. 7 is a sectional view along 7—7 of FIG. 6; and

FIG. 8 is a partial, sectional view along 8—8 of FIG. 2.

DETAILED DESCRIPTION OF THE ILLUSTRATED EMBODIMENT

Referring now to the drawings, there is shown in FIG. 1, apparatus, generally indicated as 10, for removing articles such as blow molded bottles 12 (FIG. 2) from a vertically oriented, wheel type blow molding machine, generally indicated as 14 (FIG. 1), and for depositing such articles on a downstream conveyor, generally indicated (FIG. 4) as 221.

Molding machine 14 includes a plurality of molds 18 (two being shown as typical) equally spaced from each other around the periphery, generally indicated as 13, of machine 14. Each mold 18 includes sections (FIG. 4) 20 and 22 which open parallel to the axis 24 of machine 14, in the horizontal direction indicated at 21 in FIG. 4, on suitable tie rods such as 25. Parting line 23 of each pair of sections, therefore, lies in a plane perpendicular to direction 21, or in other words to machine axis 24. Machine 14, in the illustrated embodiment, rotates continuously in counter-clockwise direction 26 and includes suitable mechanism, not shown, for causing sections 20, 22 to sequentially simultaneously close together on a portion of a continuously extruding thermoplastic parison issuing downwardly from an adjacent extruder head shown at 28 in FIG. 1, such parison entering the machine generally tangential to its periphery 13. During movement of each mold 18 from the position illustrated on the left in FIG. 1 to that shown at 29 at about 1–2 o'clock in which region sections 20 and 22 are in the open, separated position of FIG. 4, such parison portion is expanded outwardly against recessed surfaces within the mold sections to form a container 12 in conventional manner, as more fully described in U.S. Pat. No. 3,365,748.

As sections 20, 22 move back from each other away from parting line 23 (FIG. 4) article knockout pins 30, 31 biased toward parting line 23 by suitable cam surfaces, engage each article between their forward ends, prevent it from remaining in one or the other of the mold sections, and maintain it generally on parting line 23 as sections 20, 22 move to fully open position.

A conveyor for the articles 12, generally illustrated as 221 (FIG. 4), is adjacent to and downstream of apparatus 10. In the illustrated embodiment, conveyor 221 is of the forced air variety and includes an elongated housing 222 extending away from apparatus 10 in the direction of desired movement of articles 12, and which is under positive conveying air pressure generated by a conventional low pressure fan and duct, not shown. Such conveying air exits housing 222 via slots schematically shown as 224 which are oriented in the direction of conveying movement in such manner as to propel articles 12 forward in a controlled position in a conventional manner generally known to those skilled in the art. Housing 222 may be configured with an elongated slot 226 for accommodating a tail portion 228 of the semi-finished article as it is moved toward a downstream trimming station, not shown, such attached tail 228 being inserted through throat 230 by the article removal system of the invention.

Conveyor 221 may alternatively take any of a wide variety of forms known to those in the art such as a conventional, endless, horizontally moving flat surface, or an inclined chute feeding a downstream processing station directly and on which article 12 is controllably deposited by the system of the invention, to be now described.

In accordance with the principles of the invention, apparatus 10 includes turret assembly 32 (FIG. 3) comprising vertically oriented turret 34 adjacent periphery 13 of wheel machine 14 and which includes hollow, central cylindrical portion 38 supporting a pair 40, 42 of parallel opposing plates spaced from each other and projecting outwardly from cylindrical portion 38. Plates 40, 42 are configured (FIGS. 1 and 2) to form a plurality of radically extending winged sections 44, each one successively functioning as an article pickup and discharge station. Though four such stations are shown, the number may vary and generally depends on the molding capacity of machine 14. Turret drive shaft 46 extends perpendicular to the plane rotation of molding machine 14 (i.e. perpendicular to mold parting line 23), is secured at its forward end in conventional manner to a hub section of central portion 38 and is journaled part way along its length for rotation in bearings 48. Shaft 46 is bored, as shown at 47, along its length, which bore at the rearward end of shaft 46 at the top in FIG. 3 is in operative communication with a conventional source of pressure such as air, via swivel coupling 130 cooperatively connecting shaft 46 and a suitable supply conduit, not shown. An article pickup assembly generally indicated as 50 in FIG. 3 is rigidly secured to a carrier plate 90 via conventional cap screws engaging pickup assembly fluid motor 67, each plate 90 in turn being pivotally mounted at 92, 94 between each pair of opposed winged sections 44 adjacent their outer ends for arcuate movement in the general direction shown at 45 in FIG. 2.

Each pickup assembly 50 comprises (FIGS. 6 and 7) a housing 52 having a central bore 54 for slidably receiving vertically movable rod extension 56. Extension 56 is recessed at 60 on its forward end and has cross pin 62 spanning such recess 60. Two clevis members 64, 66 have U-shaped inner portions within recess 60 with legs 70a and 70b of each straddling cross pin 62. Outer ends 71 are within slots 72, 74 formed crosswise in housing 52 extending either side of recess 60 in rod extension 56. Each clevis member includes arms 76, 78 extending outwardly of cross pin 62 which carry article gripping means, which, in the illustrated embodiment, comprise a pair 80, 82 of jaws having serrated surfaces 84. In the operative position (FIG. 4) of apparatus 10 with respect to wheel 14, jaws 80, 82 are coplanar with mold parting line 23. A pair 86, 88 (FIG. 7) of fixed pivot pins span slots 72, 74 and pass through the outer end 71 of each clevis member 64, 66.

Drive means, generally indicated in FIG. 1 as 98, rotates to driven 34 in operative association or synchronism with and in a clockwise (100) circumferential direction opposite to the overall counterclockwise movement of the molding unit 14, to sequentially advance each pickup assembly 50 and its associated pair of gripping jaws 80, 82 through a portion of the space generally indicated at 102 (FIG. 4) between successively presented open mold sections 20, 22, for engagement with an article 12 in a manner to be described. Drive means 98 is exemplary in the illustrated embodiment and includes drive sprocket 104 on a shaft in the drive train for rotating wheel machine 14, which meshes with chain 106 and conventionally transmits rotation from such wheel machine drive train to sprocket 108, which in turn is mounted on a shaft 109 operatively coupled by a suitable intermediately positioned gearbox and coupling member (not shown) to a mechanism for imparting synchronous intermittent rotary motion to turret drive shaft 46, such as a right angle indexing unit schematically shown at 110 (FIG. 4). Though drive means 98 may be arranged in a conventional manner to continuously rotate shaft 46 at a fixed revolution ratio to that of wheel 14, it is preferred to utilize indexing unit 110 in order to desensitize the timing of gripping jaws 80, 82, e.g. to allow them to dwell for a moment while still engaging the removed article at the point in the cycle when the article is deposited on the downstream conveyor, this being desirable because of the instability inherent in a lightweight article such as a plastic bottle 12. Indexing unit 110 is industrially available, e.g. from Ferguson Machine Co., 7818 Maplewood Industrial Crt., St. Louis, Missouri 63143, and generally includes a series of mechanically operated cams and followers within a casing whereby for each revolution of its input shaft there is a preselected, proportional angular rotation of output shaft 111, followed by a dwell interval wherein shaft 111 is stationary and no power is transmitted foward to the driven members. Means including sprocket wheel 112 on main drive shaft 115 coupled to the output of indexing unit 110 transmits torque via intermediate power transmitting chain 113 to fixed member 114 keyed on turret drive shaft 46 in order to turn turret assembly 32. Suitable conventional chain tensioning devices and turret-to-wheel phase variating units for regulating the rate of receding movement of turret 34 away from the pickup point with respect to the peripheral movement of the wheel, all well known to those skilled in the art, may be utilized as desired as integral parts of drive means 98.

Means (FIGS. 2 and 3), generally indicated as 118, parallel to and behind turret 34 and generaly surrounding turret drive shaft 46 orient gripping jaws 80, 82 of each pickup assembly 50 with respect to (a.) article 12 during removal from between sections 20, 22 and (b.) the surface of conveyor 221 on which it is subsequently deposited. Means 118 comprises, in the illustrated embodiment, a generally cylindrical, fixed, article-attitude box cam 120 (FIG. 2) mounted on a suitable holder and having follower-movement transmitting tracks 122a, 122b formed therein along which a follower 124 for each pickup assembly 50 continuously rolls as turret assembly 32 is rotated via drive means 98. Each follower 124 is confined between tracks 122a, 122b and is rotatably mounted at one end of rod-like connecting member 126 which has its opposite end secured to carrier plate 90 (FIG. 3), the latter, as described, being pivoted to winged portions 44 of turret 34. Circumferential motion of followers 124 defined by the profile of tracks 122 is transmitted to carrier plates 90 supporting pickup assemblies 50 and therefore to jaws 80 and 82 thereof, such plates 90 being free to pivot about axes 96.

Means (FIGS. 3 and 5) generally indicated as 127, abruptly actuate gripping jaws 80, 82 of each pickup assembly 50 at the desired point in the article removal cycle, and comprise a port 128 (FIG. 3) for each of the four pickup assemblies shown, openingly communicating with axial bore 47 of turret drive shaft 46 at the end opposite that in communication with a pressurized air source. Means intermediate each port 128 and pickup assembly 50 cyclically discharge such pressure air through such ports and eventually to pickup assembly fluid motor 67, and includes valve means 132 for each assembly 50 (FIG. 3) comprising a directional flow valve member 134 mounted to a plate 135 (FIG. 5) which is secured adjacent the end of a winged portion 44 of inner plate 42 of rotatable turret 34. Valve member 134 is of industrial design and includes housing 136 (FIG. 5) having a pressurized air inlet 138 in communication via tube 139 (FIG. 3) with a port 128. An outlet in housing 136 on the side opposite that shown in FIG. 3 is conventionally connected via another section of tubing to a fixed inlet 140 of rotary coupling 142 situated between housing 136 and pickup assembly fluid motor 67. Coupling 142 allows each pickup assembly with its attached fluid motor 67 (FIG. 6) to freely pivot with carrier plate 90 to which it is secured, with respect to turret 34, while maintaining communication with fixed valve member 134. Outlet 144 in the rotatable portion of coupling 142 is conventionally piped to port 143 (FIG. 6) of pickup assembly fluid motor 67. Finger portion (FIG. 5) 146 of each valve member 134 has a motion free swivel mount 148 on its forward end supporting follower 150 mounted for rotation about axis 152.

The valve member actuation means portion of the means for actuating the gripping jaws is responsive to the position of the pickup assemblies 50 along the planar circumferential path of movement of turret 34, and includes an adjustable timing switch 154 (FIG. 4) of industrial design, (Model A by Candy Mfg. Co., Chicago, Ill.) operatively associated via chain 158 with switch output shaft 156 of indexing unit 110 of the drive means 98. Switch 154 is electrically associated via conventional circuitry with multi-port solenoid valve 160 (FIG. 5) mounted in a conventional pressurized air line feeding fluid motor means 162 which includes a piston rod portion 164 and cylinder housing 166 secured in a slot 167 in cam 120, and conventionally operatively communicating with the downstream side 168 of valve 160. Valve cam member 170 (FIGS. 3 and 5) is journaled via bearings 172 for shiftable, oscillating movement about turret drive shaft 46 and, as illustrated in FIG. 5, has profile surface 174 in continuous contact with follower 150 of each on-off flow valve member 134. Cam member 170 is secured to mounting plate 176 which in turn is pivoted at 178 to clevis 180 at one leg 182 of its forked end (FIG. 3). Thus, at a particular adjustably changeable point during the rotary output of shaft 111 of indexing unit 110, switch 154 electrically actuates valve 160 to either selectively supply pressurized air to or evacuate it from housing 166 of fluid motor means 162, which causes piston rod 164 to reciprocate in the direction of arrows 186 (FIG. 5), thereby oscillating valve cam member 170 attached to mounting plate 176 about turret drive shaft 46. Such movement in one direction in turn changes the surface to surface relationship between valve cam surface 174 and follower 150 in such manner as to cause air via suitable mechanism within housing 136 to flow through valve member 134 via port 138 to a pickup assembly fluid motor 67 in order to reciprocate piston rod portion 69 of the latter which in turn is secured to rod extension 56 of assembly 50 (FIG. 6). Movement in the opposite direction similarly vents air from such pickup assembly fluid motor 67 through valve member 134, this movement being dependent on the particular part of the cam profile surface, which includes ramp portions such as 187, in contact with the particular valve cam follower 150. In this manner gripping jaws 80, 82 of a pickup assembly 50 are either closed on, held closed or opened with respect to the article 12 being handled and transferred to conveyor 221. With the specific arrangement illustrated in the drawings, for each stroke of piston rod portion 164, the jaws of one pickup assembly are closed while those of another, 180° away, are simultaneously opened. By adjusting the point at which timing switch 154 is actuated with respect to the rotary movement of output shaft 111, the particular point in the cycle at which the jaws are closed and opened can be readily and accurately varied, thereby conveniently accommodating different article configurations. For example, if the article being handled is such as to require that gripping jaws 80, 82 should close before that shown as necessary for the configuration shown in FIG. 2, or if the article is shorter in length than that shown in FIG. 2 so as to cause a different and not so extensive a type of pivotal movement of the pickup assemblies between the pickup and discharge points, switch 154 can be used to vary the relationship between the article pickup and article discharge-defining portions of valve cam profile surface 174.

As a feature of the invention, means (FIGS. 2 and 8) may be provided for moving turret assembly 32 out of normal operative position with respect to the blow molding machine 14, (which is that shown in full lines in FIG. 1) to an inoperative, machine-servicing position shown in phantom at 191 in FIG. 1, without changing the synchronous drive relation between such machine 14 and turret 34. In this connection, turret assembly support means 198 carries the overall turret assembly 34 and includes bearings 48 (FIG. 3) for rotatably supporting turret drive shaft 46. Such means 198 includes turret support 199 journaled via bearings within housing 202 for rotative movement about main drive shaft 115 (FIGS. 4 and 8). Means 204 (FIG. 8) releasably lock turret assembly support 199 in a normal operative position with respect to machine 14 at an acute angle A (FIG. 1) on the order of 20° to a plane perpendicular to the axis of turret drive shaft 46, and comprises a block 206 biased via spring 207 in the direction 208 (FIG. 8) so as to tightly seat within a socket in a lower portion of turret assembly support 199. Thus, when desirable to move turret assembly 32 back from its operative position adjacent the periphery of machine 14 to permit access to the closely adjacent mold stations of the machine, lever 210 is twisted to extract block 206 from the socket in the turret assembly support, whereupon counterbalance tension spring 212 (FIG. 2) secured via eyelet 214 to a flange 216 at the lower end of turret assembly support 199 pivotally urges turret assembly support 199 rearwardly in direction 218 (FIG. 1) about main drive shaft 115 via the bearings in 202 to cause the turret assembly 32 and the projecting gripping jaws to tilt backwards well away from periphery 13 of the wheel machine. The reverse movement will bring such assembly back into operative position. In so moving, since sprocket members 112 and 114 of the drive train remain fixed on main drive shaft 115 and turret drive shaft 46 respectively, the synchronous relationship between machine 14 and apparatus 10 is not changed. Handles 220 and 229 on turret assembly support 199 may be used to manually augment the force generated by tension spring 212, or to oppose same depending on whether the assembly is being moved into or out of operative position.

In operation, as mold sections 20, 22 of the wheel blow molding machine 14 circumferentially approach region 29 at about a 1:30 — 2 o'clock position as determined with respect to FIG. 1, at which point in the molding cycle such sections are fully separated (FIG. 4) and the molded article 12 is being held by pins 30, 31 on parting line 23 of such sections, gripping jaws 80, 82 of a pickup assembly 50 are separated and positioned at rest above article 12 such that neck flash portion 223 (FIG. 2) of the article is moving between the jaws by the rotation of the wheel machine. While such portion 223 is between the jaws and before the article is released by retraction of the knockout pins, timing switch 154 via valve cam 170 causes such jaws to come together and close on flash 223 before it exits from between them, thereby engaging article 12 by the flash, Alternatively, however, such jaws could close on any other desired portion of the article, perhaps, in such case, necessitating a somewhat different jaw configuration. Indexing unit 110 then causes the entire turret assembly 32 to rotate in direction 100 (FIG. 1) so that the particular pickup assembly carrying the article moves in an arcuate path opposite the continuing circumferential movement of the wheel machine and toward the downstream conveyor 221 on which the article is to be eventually deposited. In the illustrated embodiment, during such indexing movement between the pickup point from between the mold sections and the point at which it is deposited on the flat supporting surface of conveyor 221, pickup assemblies 50 are pivoted via the surface profile of cam tracks 122a and 122b so that base 232 of the article 12 will be substantially horizontal or parallel with the surface of the takeaway conveyor at the point when it is deposited thereon. The exact amount of pivotal movement, however, will be determined in each case by the article configuration and the attitude desired at the release point.

After an article has been deposited on conveyor 221, continuing indexing movement of the turret causes that pickup assembly to again approach the discharge area of the wheel machine without changing its plane of advancing movement to grasp another article and begin another removal cycle. Along the path of movement between the point of discharge to the conveyor and the subsequent pickup point at the mold discharge area, pickup assemblies 50 are again pivoted such that gripping jaws 80 and 82 are oriented as illustrated in FIG. 2 to assume the proper attitude to accommodate the next presented article.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. Apparatus for removing articles from a wheel blow molding machine and depositing them on a conveyor, said machine having a central axis and a plurality of molds which include partible sections which open parallel to the axis about a parting line said apparatus comprising, in combination:

A. a turret assembly including a vertically oriented, rotatably mounted turret adjacent the periphery of the wheel machine carrying article pickup assemblies pivoted to said turret, each pickup assembly including article gripping means coplanar with the parting line of the sections;

B. drive means for moving the turret in synchronism with and in a circumferential direction opposite to that of said machine to sequentially advance the article gripping means through the space between successively presented separated mold sections for engagement with the articles;

C. means for orienting the gripping means of each pickup assembly with respect to the article being removed and said conveyor;

D. means to actuate the gripping means of the pickup assemblies; and

E. means for moving the turret assembly out of operative position with respect to said machine without changing the synchronous relation between the machine and turret.

2. The apparatus of claim 1 wherein said drive means comprises:

A. a main drive shaft;

B. a turret drive shaft; and

C. means including members fixed on each shaft for transmitting power from the main drive shaft to the turret drive shaft; and said means for moving the turret assembly out of operative position comprises:

A. turret assembly support means journaled on said main drive shaft and rotatably supporting said turret drive shaft; and B. means releasably held in operative position for pivoting the turret assembly support means about the main drive shaft toward and away from the periphery of the wheel machine.

3. The apparatus of claim 1 wherein said means for actuating the gripping means of the pickup assemblies includes:

A. valve means between said pickup assemblies and a pressurized fluid source, said valve means comprising a valve member in a conduit communicating with said source and one of said pickup assemblies; and B. valve member actuation means responsive to the position of the pickup assemblies along the path of movement of the turret.

4. The apparatus of claim 1 wherein said means for actuating the pickup assemblies further includes:

A. valve means including
  i. a valve member for each pickup assembly mounted on said turret comprising:
    a. a housing having an inlet in communication with a pressurized fluid source and an outlet in communication with said pickup assembly fluid motor; and
    b. a finger portion having a swivel mount on its forward end supporting a cam follower;
  ii. a rotary coupling between the housing and said pickup assembly fluid motor to allow said pickup assembly fluid motor to pivot with respect to the turret while maintaining communication with the valve member; and B. valve member actuation means including:
  i. a timing switch operatively associated with a rotating portion of said drive means;
  ii. a solenoid valve operatively connected with said switch and mounted in a pressurized air line;
  iii. fluid motor means including a piston rod portion and a housing operatively associated with the downstream side of said solenoid valve; and
  iv. a cam member journaled for oscillating movement about a drive shaft portion of said drive means in continuous surface to surface contact with said followers and mechanically pivotally coupled to the piston rod portion of said fluid motor means.

5. Apparatus for removing articles from a vertically oriented wheel blow molding machine and depositing them on a conveyor, said machine having a central axis and a plurality of molds which include partible sections which open parallel to the wheel axis about a parting line, said apparatus comprising in combination:

A. a turret assembly including a vertically oriented turret adjacent the periphery of the wheel machine on a rotatably mounted turret drive shaft having an axial bore in operative communication with a source of pressurized air, said turret carrying article pickup assemblies pivoted thereto, each pickup assembly including article gripping means coplanar with the parting line of the sections;

B. drive means including mechanism for imparting intermittent rotary motion to the turret in synchronism with and in a circumferential direction opposite to that of said wheel machine to sequentially advance the article gripping means through the space between successively presented separated mold sections for engagement with the articles;

C. means for orienting the gripping means of each pickup assembly with respect to the article being removed and said conveyor including:
  a. cam means adjacent said turret including a follower for each pickup assembly in continuous rolling engagement with a profile surface of a cam member portion of said cam means; and
  b. a connecting member linking each follower and one of said pivotally mounted pickup assemblies for transmitting motion generated by the follower and cam member to the pickup assemblies as a result of rotation of the turret by the drive means;

D. means to actuate the pickup assemblies comprising:
  a. a fluid motor for each pickup assembly;
  b. a port communicating with the bore of the turret drive for each pickup assembly; and
  c. an on-off valve member between each pickup assembly fluid motor and port responsive to the position of the pickup assemblies along the circumferential path of movement of the turret; and E. means for moving the turret assembly out of operative position with respect to said machine without changing the synchronous relation between the machine and turret.

6. The apparatus of claim 5 wherein said means for moving the turret out of operative position includes:

A. turret assembly support means journaled on a main drive shaft of the drive means and mounting said turret drive shaft; and B. means releasably holding the turret assembly support means in operative position for pivoting the turret assembly support means about the main drive shaft toward and away from the periphery of the wheel machine.

* * * * *